United States Patent [19]
Dennis et al.

[11] 3,746,278

[45] July 17, 1973

[54] TAPE TRANSPORT CONTROL SYSTEM

[75] Inventors: Paul A. Dennis, Hermosa Beach; William A. Schrader, Mission Viejo, both of Calif.

[73] Assignee: Ex-Cell-O Corporation, Detroit, Mich.

[22] Filed: Sept. 7, 1971

[21] Appl. No.: 178,115

[52] U.S. Cl. .................... 242/190, 242/75.51, 318/6

[51] Int. Cl. . B65h 23/20, B65h 25/04, G11b 15/46

[58] Field of Search .................... 242/190, 189, 186, 242/182, 183, 184, 185, 75.51, 75.5, 201; 318/6, 7

[56] References Cited

UNITED STATES PATENTS

| | | | |
|---|---|---|---|
| 3,565,366 | 2/1971 | Campbell, Jr. | 242/190 |
| 3,604,992 | 9/1971 | Audeh et al. | 318/6 |
| 3,304,018 | 2/1967 | Kurth | 242/184 |

*Primary Examiner*—George F. Mautz
*Attorney*—Edward J. Darin et al.

[57] ABSTRACT

A control circuit for a reel-to-reel tape transport system for controlling the transfer of tape between the reels. The control circuit includes means for sensing the demand of tape during a tape transfer operation and providing an electrical signal corresponding thereto. The demand signal is summed with a feedback signal representative of the speed of the reel drive means, and a motor current feedback signal to provide a resultant output signal to an operational amplifier. The output signals from the operational amplifier control an isolated Schmitt power trigger for energizing and de-energizing the reel drive motor. The summing junction for the operational amplifier also includes an R-C anticipation circuit for smoothing out the high speed commands to the reel drive motors to smooth out the motor operation.

16 Claims, 6 Drawing Figures

TAPE TRANSPORT CONTROL SYSTEM

This invention relates to a tape transport control system and more particularly to an improved electronic servo system for controlling the transfer of tape from a tape reel upon demand.

Tape transport systems for transferring tape from one reel to another reel are well known in the art. Various types of control systems have been developed for controlling the reels of a tape transport system to effect the desired transfer of tape in accordance with the demand for tape. These control circuits generally include the sensing of the demand of tape during a tape transport operation and provide an electrical signal corresponding thereto. This tape demand signal may be compared with a speed feedback signal of preselected magnitude and polarity for providing a signal to control the driving of the reels. This comparison output signal may be applied to the reel drives through switchable power amplifiers. These power amplifiers may be switchably controlled for energizing and de-energizing the drive means in a fashion that would allow the drives to coast during the de-energization intervals of the drive means or the associated power amplifiers. One such prior art control system is disclosed in the copending patent application bearing Ser. No. 84,758 and assigned to the same assignee as the present application.

The present application is an improvement in the type of servo control system disclosed in the copending application, Ser. No. 84,758 in that it provides a servo control system affording smoother servo action with minimum dissipation in the power output circuit means or power output transistors. The present invention is of the same general type as the servo control system disclosed in the aforementioned copending application but provides improved servo control through the implementation of a power amplifier circuit in the form of an isolated Schmitt type trigger circuit as the output circuits coupled to the drive means. The improved servo control circuit also implements a current feedback signal for controlling the energization and de-energization of the drive motor at the interval when the tape demand and supply is essentially in balance. The servo system of the present invention further provides an anticipation circuit means which is responsive to a signal for initiating the tape transfer that is characterized by a fast attack and slow decay for smoothing out the various stepping rates afforded by the system. This smoothing out may include the averaging of the reel speeds to provide a control signal for affording continuous tape advancement past a particular point in the system, such as the transducer employed with the tape system.

From a structural standpoint the present invention comprehends a tape transport system having a pair of spaced apart reels for transporting tape between the reels. The tape transport system may be embodied as a paper tape reader for sensing the information recorded on the tape so as to create a demand for the tape and signaling the system of the need for transferring tape from one reel to the other reel. For this purpose, the tape demand is signalled thorugh the provision of a tape sensing arm over which the tape stored on the reels is passed during the transfer of the tape between the reels. The tape sensing arm signals whether or not the tape is too short or too long to provide the necessary control signals to allow the servo system to produce a balance between tape supply and demand. The servo system includes the circuit means for providing a feedback signal from the reel drive means representative of the reel speed and a current feedback signal from the drive means to be effective for controlling the drive means when the tape demand and supply are essentially in balance. For this purpose, summing circuit means is coupled to be responsive to these feedback signals and the tape demand signal and to provide control signals to a power circuit for effecting the energization and de-energization of the drive motor in accordance with the sensed signals. When a pair of tape reels are controlled in this fashion the individual switchable power amplifying means, which may be in the form of isolated Schmitt triggers, may be employed for energization and de-energization of the drive means. When it is desired to advance the tape through the system at an essentially constant rate at a particular point in the system, the reel speed signals representative of the speed of the reels may be combined to provide a control signal that averages the two reel speeds to control the switchable power amplifier means in accordance therewith.

These and other features of the present invention may be more fully appreciated when considered in the light of the following specification and drawings, in which.

Figure 1:
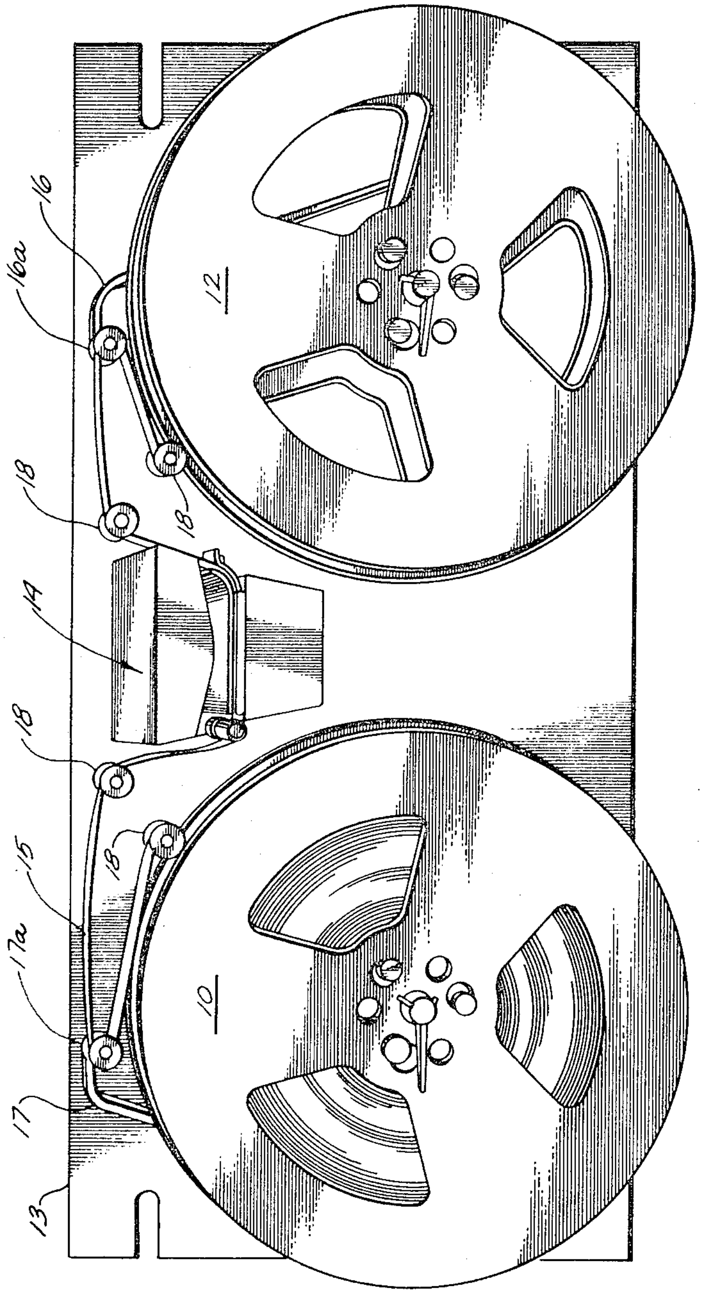
FIG. 1 is a front elevational view of a paper tape transport system embodying the invention.

Now referring to the drawings, the tape transport control system of the present invention will be examined in detail. It should be understood that although the present invention is incorporated in a tape transport system and will be described for paper tape reading purposes that it can be employed in a paper tape spooling system or may be used in any reel to reel transport system or in any system for transferring tape from one reel to another location without reference to the type of tape material being transferred or whether or not it is being transferred to another reel.

Referring to FIG. 1 wherein a typical tape transport system is illustrated comprising a pair of tape storage reels or spools 10 and 12 mounted on a panel 13 in a spaced-apart relationship with a tape reading system 14 mounted intermediate the reels 10 and 12. A paper tape 15 is illustrated as extending between the spools 10 and 12 and is guided through the reading system 14. The tape transport system includes the tape guiding arms 16 and 17 individually associated with the reels 12 and 10 for guiding the tape from reel to reel through the reading system 14 and for signaling the tape condition as will become more apparent hereinafter.

The tape transport system includes conventional tape guiding means typified by the guides 18 mounted on the panel 13 in a spaced-apart relationship and arranged for guiding the tape to and from the guide arms 16 and 17, the spools 10 and 12 and the reading system 14.

It should be noted that the reading system 14 includes drive means coupled to the paper tape 15 for advancing the tape through the reader in accordance with the reading direction for the tape. The drive motor associated with the reading system 14 is not illustrated and may be any conventional drive presently employed with such systems. The important point to be kept in mind with respect to the drive motor for the reading system for the purposes of the present invention is that it creates a demand for the tape stored on the reels and which demand must be continuously satisfied to maintain desired rate of advancement of the tape through the reader. Stated differently, the velocity of the tape as it progresses through the reading system 14 must be accurately maintained in accordance with the demand created by the reader drive motor and therefore the speed of rotation of the reels in transferring the tape supply and take-up through the reader must be correctly controlled to allow for accurate reading of the information recorded on the paper tape 15. At this point it should also be noted that the control of the drive motors employed for driving the reels 10 and 12 are independently operated and controlled in response to the individual tape condition signals in combination with the motor speed signals responsive to the actual velocity of the drive motor shafts.

Figure 2:
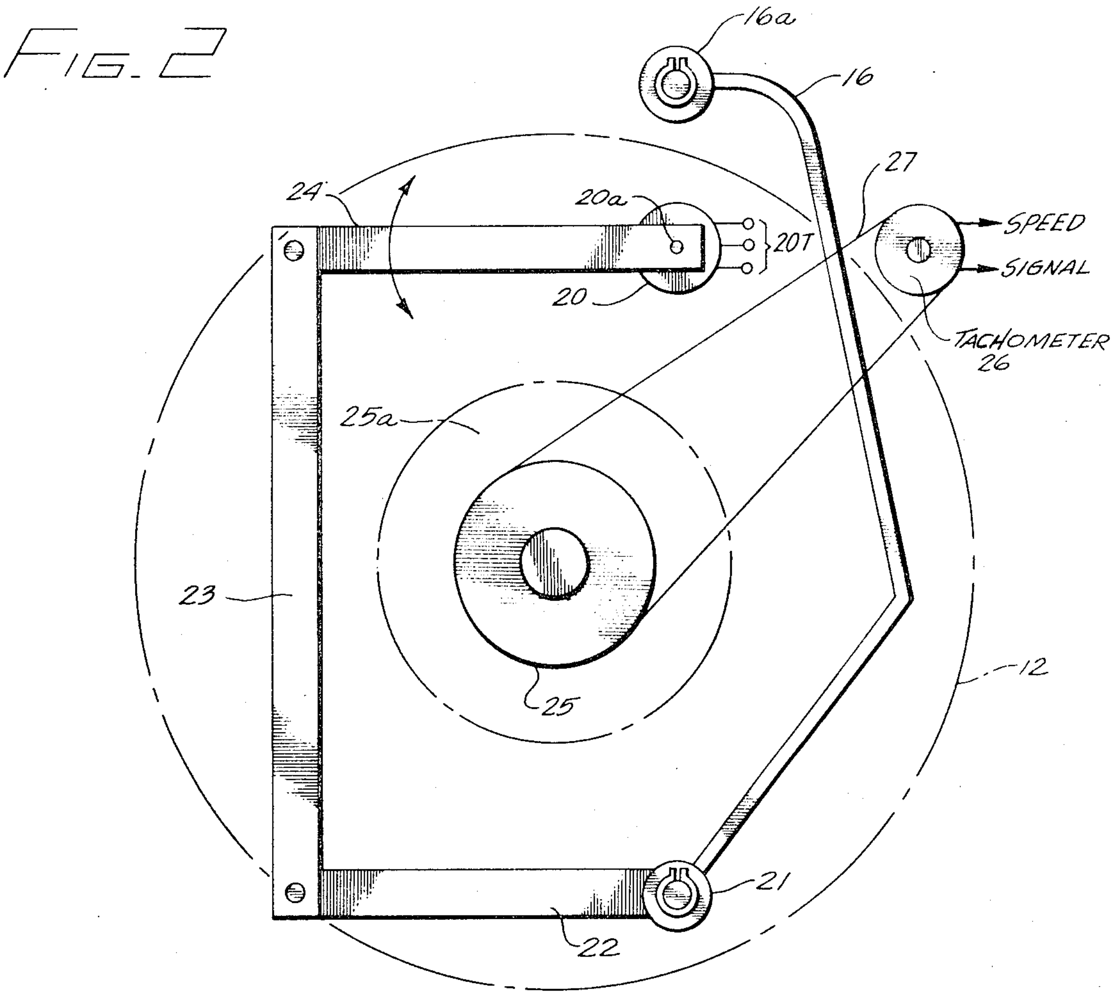
FIG. 2 is a partial view of one of the tape reel drive shafts showing the arrangement of the tape guiding arm for signalling the condition of the tape in the system and illustrating the reel in dotted outline.

As in prior art systems, the condition of the tape intermediate a tape spool and the reading system is signalled by a tape guide arm coupled with an electrical signal generator that is provided for this purpose. A tape guide arm 16 is illustrated in FIG. 2 as it is coupled to an electrical signal generator illustrated as a potentiometer 20 for providing the electrical signal representative of the tape condition of the tape associated with a particular reel or spool. The arrangement for signaling the tape condition for each of the spools 10 and 12 are identical and therefore only one such arrangement need be described. The system illustrated in FIG. 2 is that employed in combination with the tape guide arm 16 for the right hand spool as illustrated in FIG. 1. The tape guide arm 16 includes a tape guide **16*a* mounted at the free end thereof and the opposite end of the tape guide 16 is mounted with a bearing 21 to a movable arm 22 movably mounted with the bearing 21. The arrangement is such that with the movement of the tape guide arm 16 in response to the tape passing over the guide 16*a*, the arm 22 moves in response thereto. The movement of the arm 22 is transmitted to the operating arm 20*a* for the potentiometer 20 through a pair of fixed linkages 23 and 24 connected for transmitting the motion of the arm 22 to the potentiometer arm 20*a***. *The rotation of the potentiometer 20, then, in response to the movements of the tape arm 16 produce electrical output signals from terminals 20t* of the potentiometer indicative of the sensed tape condition. At this point, it should be recognized by those skilled in the art that although the potentiometer 20 is mounted in a spaced-apart relationship from the bearing 21 and the cooperating guide arm 16 that it may be mounted at the end of the guide arm that presently mounts the bearing 21. This will eliminate the linkages 22, 23 and 24 and cause the potentiometer to be directly coupled to and responsive to the guide arm 16.

The tape condition is considered as being either too long, too short or of the correct length and to provide the corresponding signals to the control system when the tape condition is short, the signal is to call for a higher velocity of the motor and a long tape signal is the signal for a lower velocity. The structural arrangement of FIG. 2 further illustrates the relationship of the drive shaft 25 with the tachometer 26 coupled thereto by means of a belt 27 for providing the feedback signal indicative of the velocity of the shaft 25. The velocity signal is provided from the tachometer 26.

Figure 3:
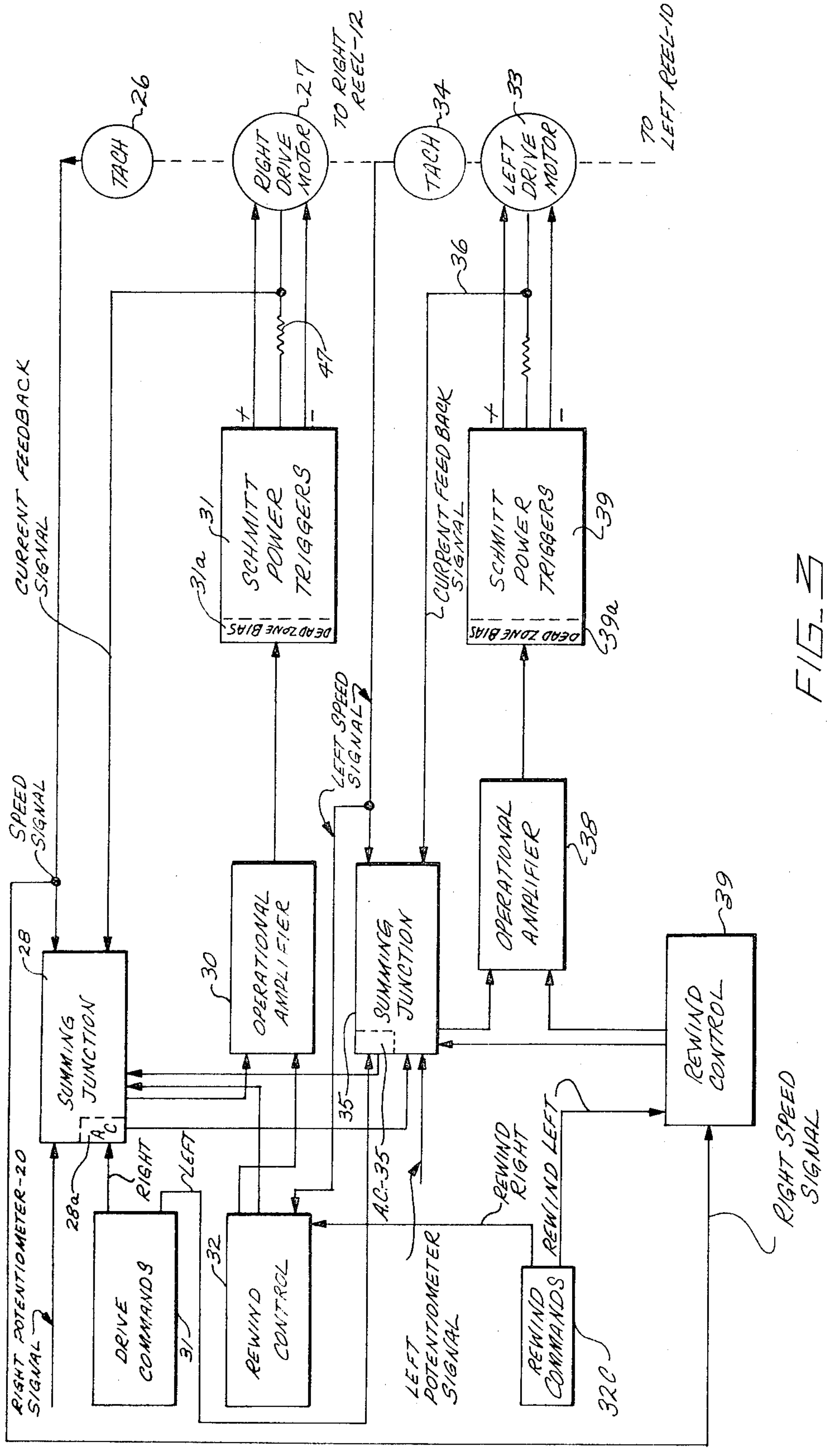
FIG. 3 is a block diagram of the control system for the tape transport system embodying the present invention.

Prior to examining the proportional servo control system in detail the invention can be better appreciated if the general organization of the system as illustrated in FIG. 3 is first considered. The general organization of the control system follows the teachings of the aforementioned copending patent application. The understanding of the invention is facilitated if the control of one of the drive motors is first considered since then, the consideration of the interrelationships of the control of both motors is simplified. The drive motor 27 is coupled to the tachometer 26 for providing a speed signal indicative of the speed at which the drive motor 27 rotates the tape reel 12 coupled thereto. The tachometer signal from the tachometer 26 is applied to a summing junction 28. The summing junction 28 also receives the signal indicative of the demand for tape which is illustrated as a right potentiometer signal from the potentiometer 20 in FIG. 3. A motor current feedback signal is also derived from the current sensing resistor 47 of the drive motor 27 and applied to the summing junction 28. The signals combined at the summing junction 28 provide a resultant signal that is applied as one input signal for the operational amplifier 30. The operational amplifier provides an output control signal to a pair of Schmitt power triggers 31. These Schmitt power triggers are arranged for energizing the drive motor 27 in opposite directions in accordance with the polarity of the output signal derived therefrom. The Schmitt power triggers 31 include a "dead zone" bias circuit 31a which defines the threshold signal level for triggering the Schmitt power triggers and thereby the energization and de-energization of the drive motor 27.

The summing junction 28 further includes an anticipation circuit means **28*a* for receiving the drive commands for initiating the travel of the tape between a pair of tape reels in accordance with the desired direction of tape transfer. The anticipation circuit is identified by the reference numeral 28*a* within the block 28 and illustrated in broken outline, and further identified as A-C. The source of drive commands are represented by the block 31 and the right drive and left drive commands are applied to the summing junction through the anticipation circuits 28*a* and 35*a* respectively. This general organization of the control system operates in the same general fashion as that described in the aforementioned co-pending patent application. In this instance, however, at the time interval in which the tape demand and supply is essentially in balance, the motor current feedback signal is effective at the operational amplifier 30 to provide an output signal that will cause the Schmitt power triggers to be switched to a non-conductive state and thereby de-energize the drive motor 27. This will smooth out the operation of the drive motor as it will not allow the drive motor 27** to coast to a low speed prior to the time that the Schmitt power trigger will again be rendered conductive and will tend to maintain the speed of the drive motor within closer limits for smoother control of the reels.

A further feature of the present invention is the provision of rewind control circuits 32 and 39 for controlling the speed of the tape transfer on rewind, in particular. The rewind controls 32 and 39 function in response to the rewind commands, left and right, respectively, from the rewind command source illustrated as the block 32*c*. The right rewind control 32 is illustrated as being applied to the other input terminal of the operational amplifier 30 and the summing junction 28. The rewind control circuit 32 is coupled to be responsive to the tachometer 34 speed signal for the left drive motor 33 (which is not under the control of the circuit 39 but is coasting) coupled to the left reel 10. In this fashion, the speed signals for the two drive motors are compared at the operational amplifier 30 in a fashion to average out the speeds so as to provide an essentially constant rate of transfer of tape from reel to reel on rewind. This rewind control circuit 32 also applies a signal to the summing junction 28 thereby overriding the potentiometer signal and establishing the desired rewind speed. The constant rate of travel of the tape may be at the tape transducer or readhead which will allow the tape to be read on rewind if so desired.

The general organization for the left drive motor 33 is the same as described for the right drive motor 27. The left drive motor 33 has an individual tachometer 34 having its output signal applied to a corresponding summing junction 35. The motor feedback signal from the drive motor 33 is also applied to the summing junction 35 by means of the lead wire 36. The summing junction also receives the tape demand signal identified as the left potentiometer signal in FIG. 3. The summing junction 35 is also coupled to be responsive to the left drive and right drive commands from the source of drive commands 31. The output signal from the summing junction 35 is coupled to the operational amplifier 38 at one input terminal thereof. The other input terminal receives the rewind control output signal from the rewind control element 39. As in the rewind control 32, the rewind control element 39 is coupled to be responsive to the opposite tachometer signal derived from the tachometer 36 for the right drive motor 27. The output of the operational amplifier 38 is coupled to the Schmitt power triggers 39 through a "dead zone" bias circuit 39*a*.

Figure 4:
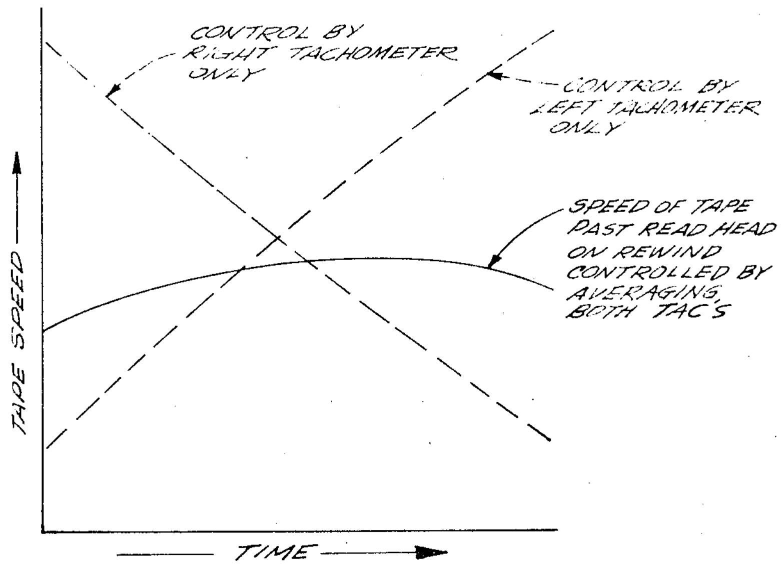
FIG. 4 is a graphical representation of the tape speeds of a pair of reels including the characterization of the average speed of tape passing a particular point in the tape transport system.

The operation of this rewind control circuit 39 is the same as described for the right drive motor 27. It should be understood that with the rewind control circuit 39 in operation that it will control the speed of the drive motor to maintain essentially constant rates of travel of the tape past a particular point such as the readhead. This control action of the resulting average rate of speed is best appreciated by examining FIG. 4, which graphically illustrates the desired relationship.

Figure 5:
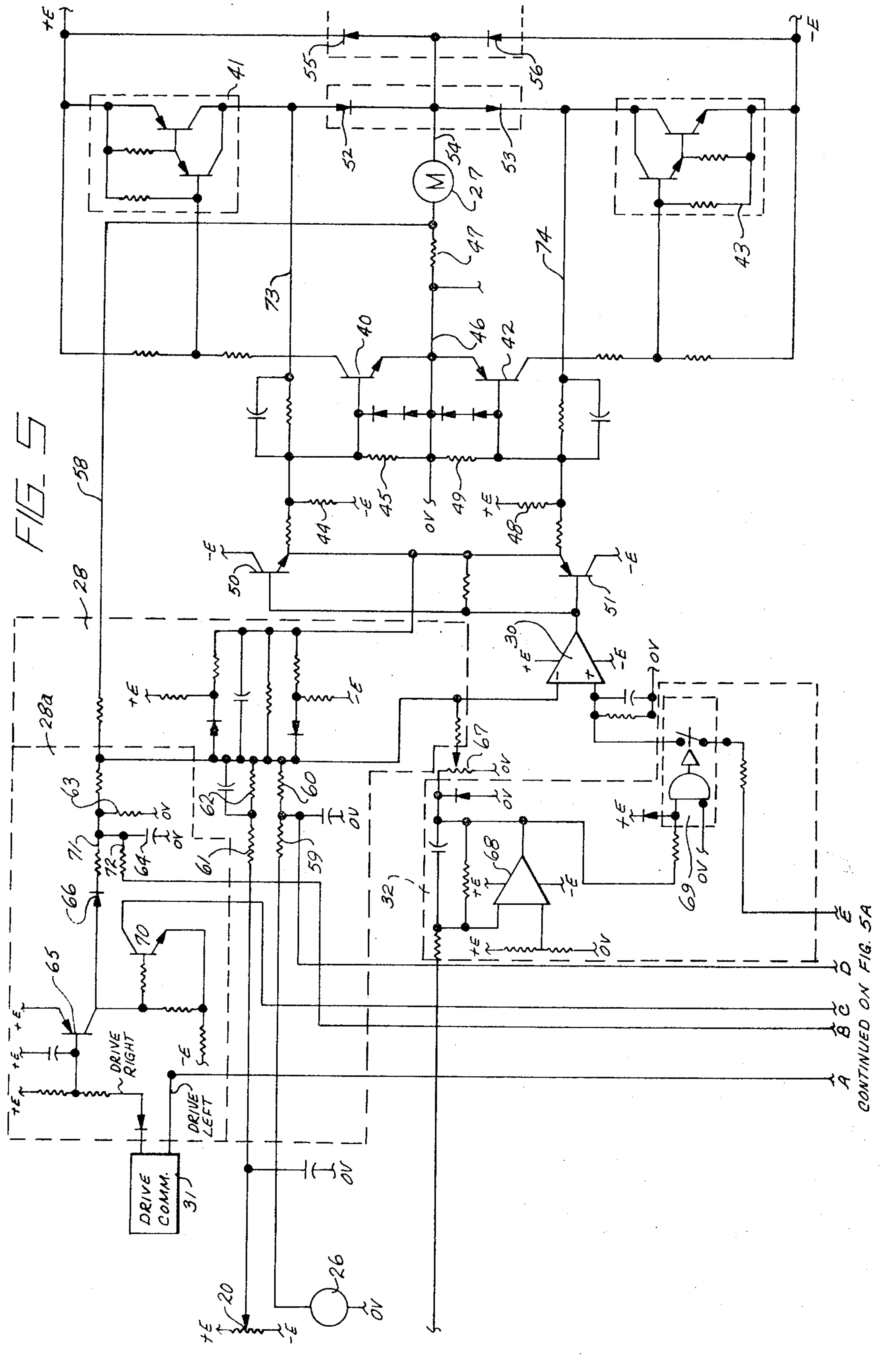
FIGS. 5 and 5A a schematic circuit diagram of the drive control system in accordance with the block diagram of FIG. 3.
Figure 5A:
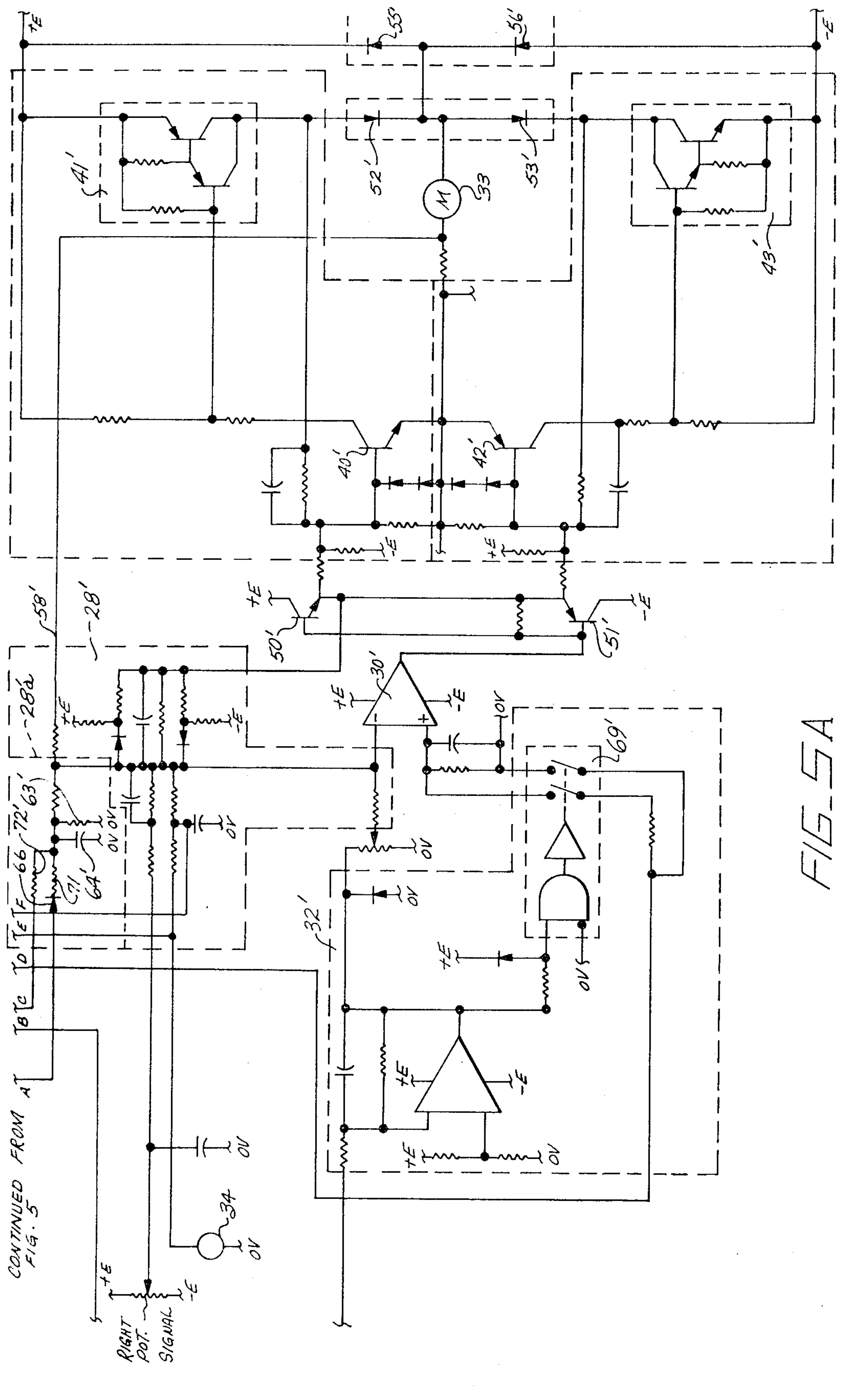

Now referring to FIG 5, the detailed circuit diagram of the control system in accordance with the general organization illustrated and described for FIG. 3 will be examined. Again, it is most convenient to consider the control for only one drive motor as the circuit details are duplicated for the two motors. Considering, then, the circuit for the right drive motor 27, it will be noted that the Schmitt power triggers 31 comprises a pair of Schmitt power triggers for energizing the drive motor 27 in opposite directions in accordance with the polarity of the energization signal applied thereto. Each Schmitt trigger 31 comprises the transistor circuit 40 in combination with a power Darlington transistor configuration identified by reference numeral 41. The circuit combination comprising transistor circuits 40 and 41 is effective to apply the positive currents to the drive motor 27, and to cause the shaft to rotate in the corresponding direction. The negative currents are applied to motor 27 by means of the combination of the transistor 42 and the power Darlington circuit arrangement 43 arranged in the Schmitt type circuit configuration. These negative currents cause the motor shaft to rotate in the opposite direction from the direction of rotation produced by the positive current energization of the drive motor 27. The implementation of the power drive of the reel drive motor by means of the Schmitt type of circuit as described hereinabove provides a self-switching action that advantageously employs the hysteresis characteristic of the Schmitt circuit. This speeds up the switching action of the transistors and reduces the power dissipation in the power Darlington. Each of the Schmitt trigger circuits are also provided with a "dead zone" bias circuit for defining the threshold signal level at which the Schmitt circuits are rendered conductive and non-conductive. This bias circuit comprises the resistors 44 and 45 arranged in the base circuit for the transistor 40. The corresponding "dead zone" bias circuit for the transistor pair 42 and 43 comprises the resistors 48 and 49 arranged in the base circuit for the transistor 42. The input signals to each of the Schmitt pairs are derived from a pair of transistor emitter follower circuits identified by the reference numerals 50 and 51 coupled to the output circuit for the operational amplifier 30 and, in turn, coupled to trigger the "dead zone" bias circuits for the Schmitt triggers in accordance with the magnitude and polarity of the signals provided by the amplifier 30.

The Schmitt trigger circuits 31 are considered as being isolated from the drive motor 27. To this end, the trigger circuits 31 are isolated from the standpoint of preventing any transient signals generated in response to the energization and de-energization of the motor 27 from energizing the drive motor in the reverse direction. These transient signals may be inductively generated voltages or the "inductive kick" signals. To this end, a pair of diodes 52 and 53 are arranged between the common lead wire 54 from the motor 27 and the feedback wires 73 and 74 of the Schmitt triggers 31. The diode 52 is connected to the power Darlington circuit 41 while the diode 53 is connected to the circuit 43. The diodes 52 and 53 are similarly poled with respect to the power supply with anodes connected to the positive terminal and the cathodes to the negative. In this manner, they pass the desired current from the Darlington transistors 41 and 43 to the motor but block the undesired inductively generated currents. A pair of diodes 55 and 56 similarly coupled to the lead wire 54 between the positive and negative terminals of the voltage source but in the opposite polarity from the diodes 52 and 54 are provided as a return path for the undesired inductively generated currents.

The summing junction circuit 28 receives the current feedback signal from the right drive motor 27 by means of lead wire 58 coupled to the motor side of the feedback resistor 47. This signal is received in combination with the signal from the right tachometer 26 which is applied through a pair of resistors 59 and 60. At this same junction, the right potentiometer signal from the potentiometer 20 is also coupled thereto by means of a pair of resistors 61 and 62. These signals are further combined with the signal derived from the anticipation circuit 28*a* which is illustrated as a R-C time delay circuit. The R-C circuit comprises the resistor 63 and capacitor 64. The signal processed by the R-C circuit is derived either from a drive right command or a drive left command. A drive right command is received by the input transistor circuit 65 and coupled to the capacitor 64 by means of a diode 66 and resistor 71 while a drive left command is coupled to the capacitor by means of transistors 65' and 70' and resistor 72. The circuit is so arranged that the capacitor 64 will be rapidly charged to a positive potential through resistor 71 upon the receipt of a drive right command or rapidly charged to a negative potential through resistor 72 upon receipt of a drive left command and to be slowly discharged through resistor 63. This characterizes the anticipation circuit 28*a* as having a fast attack and a slow decay. This circuit "anticipates" by smoothing out the on-off commands, as will be described more fully hereinafter. These signals, then, are all combined and provide a resultant output signal which functions as one input signal to the operational amplifier 30. During the interval that the tape is being transferred for normal reading operations (left to right transfer), no signal is applied to the other terminal of the operational amplifier 30. At this time, a fixed potential is applied to this terminal such as a ground level signal applied to the terminal identified as the + terminal of the amplifier 30.

It will also be noted that the summing junction 28 is also coupled to a variable potentiometer 67 for receiving a signal from the rewind control network 32. During the read operations, this signal is ineffective or inoperative at the negative terminal of the operational amplifier 30.

The rewind control 32 is illustrated as comprising a ramp generator 68 having a solid-state switch 69 coupled to the output circuit thereof. The ramp generator 68 receives the external tape control signals for actuating the desired tape transfer operations, such as the rewind operation. The solid-state switch, identified by reference numeral 69, is actuated by the right wind speed signal from the ramp generator 68 and couples the signal from the left tachometer 34 to the positive terminal of the right operational amplifier 30. When the rewind control 32 is in operation, then, it applies a signal to the positive terminal of the operational amplifier 30 to cause it initially to average the speeds of the two reel drives in accordance with the graphical representation of FIG. 4. One motor is increased in speed at a linear rate with the other linearly decreasing in speed.

The operation of the circuit for the drive motor 27, then, should be apparent from the above description. In summary, it will be noted that the Schmitt power triggers 31 will energize the drive motor in accordance with the magnitude and polarity of the signals derived from the operational amplifier 30. For this purpose, either the transistors 50 or 51 will be rendered conductive and apply a signal to the associated "dead zone" bias circuit 31*a* controlling the corresponding Schmitt power trigger 31. If a positive voltage is derived from the operational amplifier 30, transistor 50 will be rendered conductive and if the output signal is of a magnitude greater than the threshold level defined by the "dead zone" network, the associated Schmitt trigger circuit will be rendered conductive and thereby apply a corresponding polarity signal to the drive motor 27. This will provide the desired energization of the drive motor 27 upon command. When the drive motor is energized, the tachometer 26 will provide a speed signal to the summing junction 28 in combination with the current feedback singal on the lead wire 58. Also, with the initiation of the tape transfer, the potentiometer 20 will provide a signal to the summing junction. This will occur, for example, when a right drive command is applied to the summing junction 28 by means of the anticipation circuit 28*a*. At this time, and until the tape demand and supply is essentially in balance, the current feedback signal from the drive motor 27 will not be effective in defining the output signal from the operational amplifier 30. Also, during this interval the R-C network comprising the anticipation circuit will be effective for smoothing out the operation of the drive motor by smoothing out the on and off commands to the drive motor 27. This smoothing out of the commands comprises averaging the fast commands that are applied to servo systems and which approach and are beyond the response time of the system. The slow commands to which the system is easily responsive will not be averaged out.

At the time interval then, when the tape supply and demand are essentially in balance, the current feedback signal from the lead wire 58 will be effective at the input of the amplifier 30 to cause it to provide a signal for de-energizing the drive motor 27. The signal derived from the amplifier 30 at that time, then, will be below the threshold lever defined by the "dead zone" bias circuit causing the de-energization of the drive motor. At this time, then any tendency for producing an inductive voltage or "inductive kick" from the motor will be suppressed by the diodes 52, 54, 55, and 56.

The operation of the servo in response to a "rewind" command is essentially the same except at this time the rewind control network 32 applies a "desired speed" signal to the summing junction thereby overriding the potentiometer signal and closes the solid-state switch 69. to couple the speed signal for the tachometer 34 to the + terminal of operational amplifier 30 for controlling the drive motor 27. With the application of this signal, the speeds of the two tachometers are averaged out to provide and average speed of the tape past the readhead.

What is claimed is:

1. In a tape transport system for transferring tape from a storage reel including at least a single rotatable tape storage reel having tape extending therefrom, means for driving the storage reel to transfer tape therefrom, means for sensing the demand of tape for transferring tape from said reel and providing an electrical signal corresponding thereto, means for providing a speed feedback signal from said drive means representative of the speed thereof, means for comparing the speed feedback signal and the signal from said sensing means and providing a drive control signal corresponding thereto, power circuit means connected to be responsive to the drive control signals for applying a speed control signal to said drive means for energizing and de-energizing the drive means for rotation in a direction in accordance with the sensed tape demand, and
circuit means coupled between the drive means and the comparing means for providing a current feedback signal from the drive means thereto to be effective at the comparing means when the drive means reaches a desired speed for providing an output control signal to de-energize the power circuit means.

2. In a tape transport system as defined in claim 1 including an anticipation circuit means coupled to be responsive to a signal for initiating a tape transfer operation for providing a signal to the comparing means for discriminating between rapidly changing commands and longer term commands, and averaging the more rapid, to thereby smooth out the operation of the drive.

3. In a tape transport system as defined in claim 2 wherein said anticipation circuit means comprises an R-C circuit.

4. In a tape transport system as defined in claim wherein the power circuit means is electrically isolated from the transient signals of the drive means.

5. In a tape transport system as defined in claim 1 wherein a pair of rotatable storage reels are employed for transferring tape therebetween, and individual means for providing a speed signal representative of the speed of each reel drive means, and said comparison circuit means comprising individual comparison circuits for each drive means coupled to be responsive to the speed signal from the other drive means for providing an output signal that causes the tape to be advanced at a relatively constant speed.

6. In a tape transport system as defined in claim 1 wherein the tape demand sensing means includes a movable tape guiding arm movable in accordance with the demand created for the tape and coupled to electrical signal generating means for providing varying electrical signals in accordance with the arm movements.

7. In a tape transport system as defined in claim 6 wherein the electrical signal generating means is a potentiometer coupled to the tape guiding arm.

8. In a tape transport system as defined in claim 6 wherein the speed sensing means is a tachometer coupled to the drive means.

9. Apparatus for transferring tape from one tape storage location to another tape storage location including
first and second storage reels mounted in a preselected spaced apart relationship for transferring tape from one of the reels to the other reel and having tape extending between the reels,
means for sensing the demand of tape from one storage reel to the other storage reel and providing an electrical signal corresponding thereto,
individual means for driving each of the storage reels,
individual circuit means for sensing the speed of each of the drive means and providing electrical output signals corresponding thereto,
means for providing a current feedback signal from each of the individual drive means,
individual summing circuit means coupled to be responsive to the individual speed signals, tape demand signals, current feedback signal, and providing a resultant output signal,
operational amplifier circuit means coupled to be responsive to the resultant output signal and providing a corresponding drive control signal,
individual switchable power amplifying means for energizing and de-energizing an individual one of the drive means in a direction in accordance with the polarity of the corresponding drive control signal, said power amplifying means including circuit means for defining a threshold drive control signal level for defining the non-conductive state of the power amplifying means,
the current feedback signal being effective for defining the non-conductive condition of the power amplifying means during the intervals the tape demand and drive speed signals are in balance.

10. Apparatus as defined in claim 9 including an R-C circuit coupled to be responsive to a tape transfer signal for initiating the transfer of tape from one reel to the other reel and coupled to the summing circuit means.

11. Apparatus as defined in claim 9 wherein the power amplifying means comprise isolated Schmitt type trigger circuits.

12. Apparatus as defined in claim 9 including individual isolation means coupled between the drive means and the power amplifying means for de-coupling any inductively generated signal from energizing the drive means.

13. Apparatus as defined in claim 9 including individual rewind control means coupled to be responsive to the speed signal for the other drive means and coupled to the operational amplifier in combination with the resultant output signal to provide a drive control signal to the individual drive means representative of the average speed of the individual drive means.

14. Apparatus as defined in claim 13 wherein said sensing means includes a swingable tape guide arm mounted adjacent each of the reels and engaging the tape extending between the reels to be swingable in response to the changes in tape demand, and electrical signalling means associated with each of the guide arms and coupled to be responsive to the positions of the arms for providing electrical signals corresponding thereto.

15. Apparatus as defined in claim 13 including tachometer means for providing the speed feedback signal.

16. Apparatus as defined in claim 15 wherein said electrical signalling means comprises individual potentiometer means having a movable arm for each guide arm and means coupled between each of the guide arms and the individual potentiometer arms for changing the position of the latter arms to correspond to the position of the individual guide arms thereby providing the desired demand signals.

* * * * *

7463:EJD

PO-1050
(5/69)

UNITED STATES PATENT OFFICE
CERTIFICATE OF CORRECTION

Patent No. 3,746,278 Dated July 17, 1973

Inventor(s) Paul A. Dennis and William A. Schrader

It is certified that error appears in the above-identified patent and that said Letters Patent are hereby corrected as shown below:

| | |
|---|---|
| Col. 1, line 1 | insert sub-title --Disclosure of the Invention- |
| Col. 1, line 29 | after "Ser. No. 84,758" insert --now U.S. Pat. No. 3,717,316 granted Feb. 20, 1973-- |
| Col. 1, line 61 | "thorugh" should read --through-- |
| Col. 2, line 39 | "5A a schematic" should read --5A are a schematic-- |
| Col. 3, lines 56-58 | Please correct type-face |
| Col. 4, line 59 | after "application" insert --,now United States Patent No. 3,717,316.-- |
| Col. 8, line 43 | "69. to" should read --69 to-- |
| Col. 8, line 47 | "provide and" should read --provide an-- |
| Col. 9, line 20 (Claim 4) | "in claim" should read --in claim 1-- |
| Title Page Attorney -- | "Edward J. Darin et al." should read --Edward J. DaRin et al.-- |

Signed and sealed this 2nd day of April 1974.

(SEAL)
Attest:

EDWARD M.FLETCHER,JR.
Attesting Officer

C. MARSHALL DANN
Commissioner of Patents